W. J. WELCH.
MOUNTING OF SADDLES UPON BICYCLES.
APPLICATION FILED JUNE 28, 1909.
960,467.
Patented June 7, 1910.
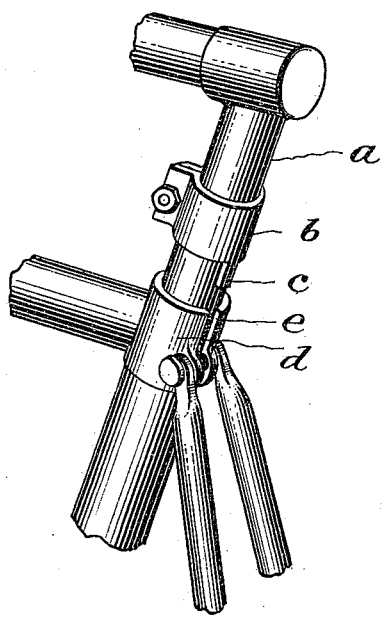
Witnesses:
E. Schallinger
R. Goodstein
Inventor:
William J. Welch
by J. Singer
Att'y

UNITED STATES PATENT OFFICE.

WILLIAM JAMES WELCH, OF HORNSEY, LONDON, ENGLAND.

MOUNTING OF SADDLES UPON BICYCLES.

960,467.  Specification of Letters Patent.  Patented June 7, 1910.

Application filed June 28, 1909. Serial No. 504,856.

*To all whom it may concern:*

Be it known that I, WILLIAM JAMES WELCH, a subject of the King of Great Britain, residing at "Hillfield," Hillfield avenue, Hornsey, London, England, have invented certain new and useful Improvements in and Relating to the Mounting of Saddles upon Bicycles, of which the following is a specification.

My invention for improvements in and relating to the mounting of saddles upon bicycles relates to a method of mounting the saddle with its attached pin so that it can be readily detached for the purposes of adjustment by means of a clip fixed on the saddle pin and having a tongue or projection engaging with a corresponding recess in the seat pillar lug.

Now this invention consists in making such a clip so that when in place it is positively prevented from rotating and so that it shall be applicable to all cycles. For this purpose the saddle pin and its socket are provided with interlocking stops which positively prevent rotation of the pin in its socket, one of the stops being made adjustable in height. By this arrangement the saddle can be removed and replaced instantaneously and is absolutely locked from swiveling movement so that it can be ridden without any other fastening with absolute safety.

Referring to the accompanying drawing, the figure shows one form of the invention.

In the form shown the adjustable collar or clip $b$ is adapted to be clamped in any position on the seat pin $a$. The clip $b$ has a downwardly extending tongue $c$. The seat pillar lug is split as usual, and the slot is widened out if necessary as shown so that the tongue $c$ may fit in the slot.

In fitting the saddle the socket is opened out if necessary so that the saddle pin fits loosely therein and is preferably clamped in this position. The clip $b$ is tightened lightly on the saddle pin $a$ at the desired height, and the saddle pin inserted in its socket and twisted into the correct horizontal position and the clip tightened securely.

I claim—

A saddle post retainer for bicycles comprising in combination, a one piece socket split on one side with the split portions normally spaced apart, a saddle post fitting relatively loosely in said socket, means for holding the split portions adjacent one another and in spaced relation, a band clip embracing said post and adapted for engagement with said socket, said clip being provided with a tongue or extension fitting between said split portions, and means for tightening said clip on said post to prevent downward and rotative movement of the post with respect to the socket.

In testimony whereof I have affixed my signature, in presence of two witnesses.

WILLIAM JAMES WELCH.

Witnesses:
H. D. JAMESON,
F. L. RANDS.